United States Patent Office 2,837,572
Patented June 3, 1958

2,837,572

PRODUCTION OF ALIPHATIC ETHERS

Walter Rottig, Oberhausen-Sterkrade-Nord, Germany, assignor to Ruhrchemie Aktiengesellschaft, Oberhausen-Holten, Germany, a German corporation No Drawing. Application November 1, 1950
Serial No. 193,520

Claims priority, application Germany November 25, 1949

5 Claims. (Cl. 260—614)

This invention relates to improvements in the production of aliphatic ethers.

Aliphatic ethers can be obtained in the known manner by dehydrating aliphatic alcohols. This reaction takes place in accordance with the general equation:

$$2C_nH_mOH = C_nH_m-O-C_nH_m + H_2O$$

one molecule of water being split off from two molecules of alcohol with simultaneous condensation. Olefin hydrocarbons such as alkyl sulphates are produced in this connection as undesired by-products. The olefins can be polymerized partly into higher molecular hydrocarbons by the action of sulphuric acid. To carry out this known reaction of the alcohols, catalysts can be used which consist of porous substances, as for example, kieselguhr, fuller's earth, and aluminum oxide. Such methods however have the disadvantage that the reaction takes place to a large extent monomolecularly, and relatively large quantities of undesirable olefin hydrocarbons form.

It has now been found that these side reactions do not take place, and the aliphatic alcohols used are converted into the corresponding ethers with a higher yield, if the alcohols which are to be dehydrated are passed, at pressures of 1 to 30 kilos per sq. cm. and temperatures 150 to 350° C., over catalysts consisting of metals and/or metallic compounds of the 8th group of the periodic system and activating metallic oxides of the second and/or fourth group of the periodic system and of inert carriers, such as kieselguhr, aluminium-oxide, fuller's earth and similar substances. Of the metals of the eighth group of the periodic system, iron, cobalt and nickel have proven particularly suitable. The activating metal oxides consist preferably of magnesium oxide, thorium oxide, calcium oxide, and similar oxides. With these catalysts the formation of the ether takes place at such low temperatures that olefins are no longer produced to any appreciable extent. Any possible formation of aldehydes can be practically completely repressed by the addition of small quantities of hydrogen.

The method in accordance with the present invention can be carried out at atmospheric pressure. The use of reaction pressures greater than atmospheric pressure is particularly advantageous. The aliphatic alcohol which is to be converted is first of all heated to a sufficient extent in a suitable vessel and introduced at a suitable pressure into the catalyst chamber. The amount of the catalyst is preferably so selected that 0.5 to 10 liters of liquid alcohol per liter of catalyst are passed through every hour. Depending on the boiling point of the alcohol, the reaction temperature and the operating pressure are so adjusted to each other that the reaction takes place in liquid phase.

In order to avoid a dehydration of the alcohol and the formation of aldehyde, hydrogen can be introduced into the catalyst chamber simultaneously with the vaporized alcohol. After the separation of the reaction products this hydrogen can be recycled. The hydrogen is preferably used in amounts of 1 to 100 liters per liter of liquid alcohol. At times, the simultaneous formation of aldehydes is, however, desirable. In such case, the reaction is carried out without the addition of hydrogen.

The reaction temperatures entering into question in accordance with the present invention are preferably between 150 and 275° C. Below 150° C. the reaction is generally too slow, while above 275° C., undesirable side reactions take place to an ever increasing extent, as for instance, the formation of olefins or of aldehydes.

The catalysts used in accordance with the invention are preferably prepared by precipitation reactions. For this purpose, a hot solution containing salts of the catalyst metal and of the activators is precipitated in hot condition with suitable alkali compounds, preferably sodium carbonate or potassium carbonate. After the precipitation the required quantity of the carrier is brought into the solution and worked as thoroughly and uniformly as possible into the precipitated catalyst mass by means of a rotary high speed mixer. Thereupon, the solution is filtered off and the moist catalyst mass is dried and shaped.

The catalyst is preferably reduced before using it. This reduction is preferably effected with hydrogen or hydrogen-rich gases at temperatures of 200 to 400° C. 50 to 80% of the catalyst metal should be reduced in this connection.

The life of the catalysts is particularly long if the ether formation is carried out with the addition of hydrogen and if alcohols which are as pure as possible are used. When the activity of the catalysts decreases, a regeneration of the catalysts can be effected comparatively easily. For this purpose, the catalyst is treated with oxidizing gases, for example, air, at temperatures of 200 to 400° C. Following the oxidation, a reduction must be effected with hydrogen-containing gases. At times, the catalyst can be freed from the impurities which are reducing its activity by a single hydrogen treatment at temperatures of 350 to 450° C. The nature of the catalyst regeneration which should be used depends on the side products which are present in the treated alcohol.

The following examples are furnished by way of illustration but not of limitation:

Example I

At a temperature of 225° C. and a pressure of 1 kilo per sq. cm., 300 cc. of propyl alcohol were passed each hour over 300 cc. of a catalyst which consisted of 200 parts kieselguhr, 100 parts cobalt, 10 parts magnesium oxide and 5 parts thorium oxide ($ThO_2$). This catalyst was prepared in a manner known per se by precipitation out of a solution of suitable nitrates followed by washing, drying, shaping and reduction. Upon being worked up, the reaction products produced gave about 10% propyl ether and 8% propylaldehyde. The rest of the reaction product consisted of unreacted propyl alcohol, which was returned for recycling.

When, during the reaction, about 15 liters of hydrogen at normal temperature and pressure were passed per hour over the catalyst, the aldehyde content of the reaction product reduced from 8% to about 1%, the formation of ether increasing to a corresponding extent.

Example II

At a temperature of 220° C. and a pressure of 1 kilo per sq. cm., butyl alcohol was passed over the catalyst used in Example I. The hourly charge was 1500 cc. butyl alcohol per liter of catalyst. The condensed reaction product contained about 12% dibutyl ether and about 7% butyraldehyde, in addition to unreacted butyl alcohol. When, at the same time, 10 liters of hydrogen at normal temperature and pressure were passed per hour over the catalyst, the formation of aldehyde decreased to about 1 to 2%.

*Example III*

Butyl alcohol at 200° C. and 5 kilos per sq. cm. was passed over a catalyst consisting of 50 parts kieselguhr, 100 parts nickel and 15 parts magnesium oxide. The charge was 1500 cc. liquid butyl alcohol per liter of catalyst per hour. The catalyst was precipitated in the known manner from a solution of corresponding nitrates with soda, washed well, dried and reduced with hydrogen at 380° C.

The liquid reaction product obtained contained about 20% dibutyl ether and about 4% butyraldehyde and the balance consisted of unreacted butyl alcohol and was returned for recycling.

By the simultaneous introduction of about 15 liters of hydrogen, normal temperature and pressure, per hour, the formation of butyraldehyde was practically entirely suppressed.

*Example IV*

Two parts by volume of propyl alcohol for each one part by volume of catalyst were conducted per hour at a temperature of 200° C. over the catalyst used in Example III. The reaction product contained approximately 7% dipropyl ether and 6% propionaldehyde in addition to unreacted propyl alcohol. By the simultaneous introduction of 20 liters of hydrogen, normal temperature and pressure, the propionaldehyde content was reduced from 6% to approximately 1 to 1½%.

*Example V*

Two parts by volume of propyl alcohol for each part by volume of catalyst were passed per hour at a temperature of 200° C. and with a reaction pressure of 20 kilos per sq. cm. over the catalyst used in Example III. At the same time, 20 liters of hydrogen, normal temperature and pressure, were introduced per hour into the catalyst chamber, together with the propyl alcohol.

The liquid reaction product contained about 28% dipropyl ether and about 3% propionaldehyde. The balance consisted of unreacted propyl alcohol.

I claim:

1. In the method for the production of aliphatic ethers, the improvement which comprises passing an aliphatic alcohol at a pressure of about 1–30 kg./cm.$^2$ and a temperature of about 150–350° C. in contact with a substantially solid contact catalyst consisting essentially of kieselguhr, magnesium oxide, thorium oxide, and a member selected from the group consisting of cobalt and nickel, and recovering the aliphatic ether formed.

2. Improvement according to claim 1, in which said contact is effected in the presence of about 1 to 100 liters of hydrogen per liquid liter of alcohol.

3. Improvement according to claim 1, in which said catalyst is regenerated after said contact by treatment with an oxidizing gas at a temperature of about 200 to 400° C. followed by reduction.

4. Improvement according to claim 1, in which said catalyst is regenerated after said contact by treatment with hydrogen at a temperature of about 350 to 450° C.

5. Improvement according to claim 1, in which said contacting is effected at a temperature of about 150°–270° C.

References Cited in the file of this patent

UNITED STATES PATENTS

| | | |
|---|---|---|
| 1,855,255 | Nitardy et al. | Apr. 26, 1932 |
| 2,014,408 | Woodhouse | Sept. 17, 1935 |
| 2,273,298 | Szayna | Feb. 17, 1942 |
| 2,328,059 | Craig | Aug. 31, 1943 |
| 2,415,878 | Hale | Feb. 18, 1947 |

FOREIGN PATENTS

| | | |
|---|---|---|
| 81,777 | Switzerland | Dec. 1, 1919 |
| 403,402 | Great Britain | Nov. 30, 1933 |

OTHER REFERENCES

Ipatieff: "Catalytic Reactions," pages 79–120 (1936). The Macmillan Company, New York, N. Y.

Berkman et al.: "Catalysis," page 738 (1940), Reinhold Publishing Corp., New York, N. Y.